United States Patent
Kilner et al.

(10) Patent No.: US 9,760,288 B2
(45) Date of Patent: Sep. 12, 2017

(54) DETERMINING CAUSES OF EXTERNAL FRAGMENTATION OF MEMORY

(71) Applicant: International Business Machines Corporation, Armonk, NY (US)

(72) Inventors: Matthew R. Kilner, Bournemouth (GB); David K. Siegwart, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 14/624,990

(22) Filed: Feb. 18, 2015

(65) Prior Publication Data

US 2016/0239216 A1    Aug. 18, 2016

(51) Int. Cl.
G06F 3/06 (2006.01)
G06F 11/34 (2006.01)
G06F 11/07 (2006.01)
G06F 12/02 (2006.01)

(52) U.S. Cl.
CPC .......... *G06F 3/0608* (2013.01); *G06F 3/0653* (2013.01); *G06F 3/0673* (2013.01); *G06F 11/073* (2013.01); *G06F 11/079* (2013.01); *G06F 11/3466* (2013.01); *G06F 12/023* (2013.01); *G06F 11/3476* (2013.01); *G06F 2201/86* (2013.01); *G06F 2201/865* (2013.01); *G06F 2206/1004* (2013.01); *G06F 2212/1044* (2013.01)

(58) Field of Classification Search
None
See application file for complete search history.

(56) References Cited

U.S. PATENT DOCUMENTS

| 6,560,773 | B1 | 5/2003 | Alexander, III et al. |
| 7,519,639 | B2 | 4/2009 | Bacon et al. |
| 7,908,591 | B1 | 3/2011 | Nell et al. |
| 8,069,330 | B2 | 11/2011 | Chedru |
| 8,612,493 | B2 | 12/2013 | Micic et al. |
| 8,838,928 | B2 | 9/2014 | Robin et al. |

(Continued)

OTHER PUBLICATIONS

International Search and Written Opinion for PCT/EP2016/052504; Dated Mar. 30, 2016; pp. 6.

(Continued)

*Primary Examiner* — Denise Tran
(74) *Attorney, Agent, or Firm* — Edward P. Li

(57) ABSTRACT

A method of determining causes of external fragmentation in a memory. The method includes collecting information associated with release of an area of the memory by an application, storing the information in the area of the memory, and analyzing the information to determine why the area of the memory has not been reallocated to any application. In embodiments wherein a first portion of an area of a memory is allocated to an application by an allocator and a second portion of the area of the memory is released by the allocator, the method includes storing in the second portion of the area of the memory an indicator indicating that the second portion is a remaining portion, colleting information associated with release of the second portion, storing the information in the second portion, and analyzing the information to determine why the second portion is not reallocated to any application.

8 Claims, 8 Drawing Sheets

(56) References Cited

U.S. PATENT DOCUMENTS

2007/0136385 A1* 6/2007 Abrashkevich ....... G06F 11/366
2007/0136546 A1 6/2007 Krauss
2009/0150633 A1 6/2009 Lee et al.
2014/0143593 A1 5/2014 Strauss et al.

OTHER PUBLICATIONS

U.S. Appl. No. 14/831,256, filed Aug. 20, 2015 entitled "Determining Causes of External Fragmentation of Memory".
Appendix P "List of IBM Patents or Patent Applications Treated as Related" dated Aug. 20, 2015 pp. 2.
De Capitani Di Vimercati et al., "Fragmentation in Presence of Data Dependencies", IEEE Transactions on Dependable and Secure Computing, vol. 11, No. 6, Nov./Dec. 2014, © 2013 IEEE, pp. 510-523.

* cited by examiner

| | |
|---|---|
| 700 | STATISTICAL METRICS FOR THOSE AREAS OF MEMORY ASSOCIATED WITH A GIVEN CALLER ID |
| 702 | COUNT |
| 704 | MEAN VALUE OF SIZES |
| 706 | HISTOGRAM OF SIZES |
| 708 | TOTAL COUNT OF UNSATISFIED ALLOCATION REQUESTS |
| 710 | MEAN LIFETIME OF DESTROYED OBJECTS IN CPU OR ELAPSED TIME |
| 712 | MEAN LIFETIME OF DESTROYED OBJECTS IN NUMBER OF ALLOCATIONS THAT THE APPLICATION MADE DURING THOSE LIFETIMES |
| 714 | MEAN LIFETIMES OF DESTROYED OBJECTS IN NUMBER OF BYTES ALLOCATED THAT THE APPLICATION MADE DURING THOSE LIFETIMES |

Figure 7

DETERMINING CAUSES OF EXTERNAL FRAGMENTATION OF MEMORY

TECHNICAL FIELD OF THE INVENTION

The present invention relates to memory management, and more particularly to determining causes of external fragmentation of memory.

BACKGROUND

Fragmentation of a memory region, such as a heap, can cause many performance issues in computer systems such as long execution times and larger memory requirements. Eliminating, avoiding or diagnosing fragmentation may have significant benefits to the operation of the computer system.

External fragmentation is when the free chunks of memory ("holes") available for allocation are too small to satisfy a new request to allocate memory, the purpose often being to create a new "object". In the context of this patent application, an "object" is an entity that has both data and a unique identifier associated with that data; that identifier may be the location of that data in memory. An object is dynamically allocated, that is the area of memory that represents its data can be allocated and freed by an application via an "allocator". In the context of this patent application, an object is "alive" when an object's data has not been released by the application. The object may be "destroyed" by the application; that is the application deallocates the object's data via the allocator which releases the memory back to the freelist, and the object "dies". Typically, an allocator needs to traverse a list of holes, known as a freelist, until the allocator can find a hole in the memory that is large enough to satisfy the allocation request. Traversal of the freelist costs execution time and holes that are too small to be allocated waste memory. External fragmentation is often caused when there are objects of different lifetimes allocated within the same area of memory. When short-lived objects die the holes left between the surviving longer-lived objects are often smaller than the new objects that are to be created. The holes collectively are the external fragmentation. The smaller and more extensive the holes are in the freelist, the more fragmented the memory becomes.

The previous disclosures can determine when external fragmentation occurs by analyzing the freelist and recognizing whether the freelist consists of many small holes, but the previous disclosures cannot determine what is causing those holes, where those holes were created, and therefore the previous disclosures cannot offer any suggestions about what computer readable program instructions needs to be changed in order to reduce, avoid or eliminate the fragmentation. It would be desirable to improve the diagnosis and avoidance of fragmentation, specifically external fragmentation.

SUMMARY

Embodiments of the present invention provide a method for determining causes of external fragmentation in a memory, wherein an area of the memory is released by an application, deallocated by an allocator, and not reallocated to any application. The method includes collecting information associated with release of the area of the memory by the application. The method further includes storing the information in the area of the memory. The method further includes analyzing the information to determine why the area of the memory has not been reallocated to any application.

Embodiments of the present invention also provide a method for determining causes of external fragmentation in a memory, wherein a first portion of an area of a memory is allocated to an application by an allocator and a second portion of the area of the memory is released by the allocator. The method includes storing, in the second portion of the area of the memory, an indicator indicating that the second portion is a remaining portion. The method further includes colleting information associated with release of the second portion. The method further includes storing the information in the second portion. The method further includes analyzing the information to determine why the second portion is not reallocated to any application.

Embodiments of the present invention also provide a system for determining causes of external fragmentation in a memory, wherein an area of the memory is released by an application, deallocated by an allocator, and not reallocated to any application. The system includes an allocator. The allocator collects information associated with release of an area of the memory by an application and stores the information in the area of the memory. The system further includes an analyzer for analyzing the information to determine why the area of the memory is not reallocated to any application. In the system, the area of the memory is deallocated by an allocator and not reallocated to any application.

Embodiments of the present invention also provide a computer program product for determining causes of external fragmentation in a memory, wherein an area of the memory is released by an application, deallocated by an allocator, and not reallocated to any application. The computer program product comprising a computer readable storage medium having program code embodied therewith. The program code is executable to: collect information associated with release of the area of the memory by the application; store the information in the area of the memory; analyze the information to determine why the area of the memory has not been reallocated to any application.

Embodiments of the present invention also provide a computer program product for determining causes of external fragmentation in a memory, wherein a first portion of an area of a memory is allocated to an application by an allocator and a second portion of the area of the memory is released by the allocator. The computer program product comprising a computer readable storage medium having program code embodied therewith. The program code is executable to: store, in the second portion of the area of the memory, an indicator indicating that the second portion is a remaining portion; collet information associated with release of the second portion; store the information in the second portion; analyze the information to determine why the second portion is not reallocated to any application.

BRIEF DESCRIPTION OF THE DRAWINGS

FIG. 7 shows a set of statistical metrics that is maintained based on the information collected by the embodiment of FIG. 5, in accordance with one embodiment of the present invention.

DETAILED DESCRIPTION

Figure 1:
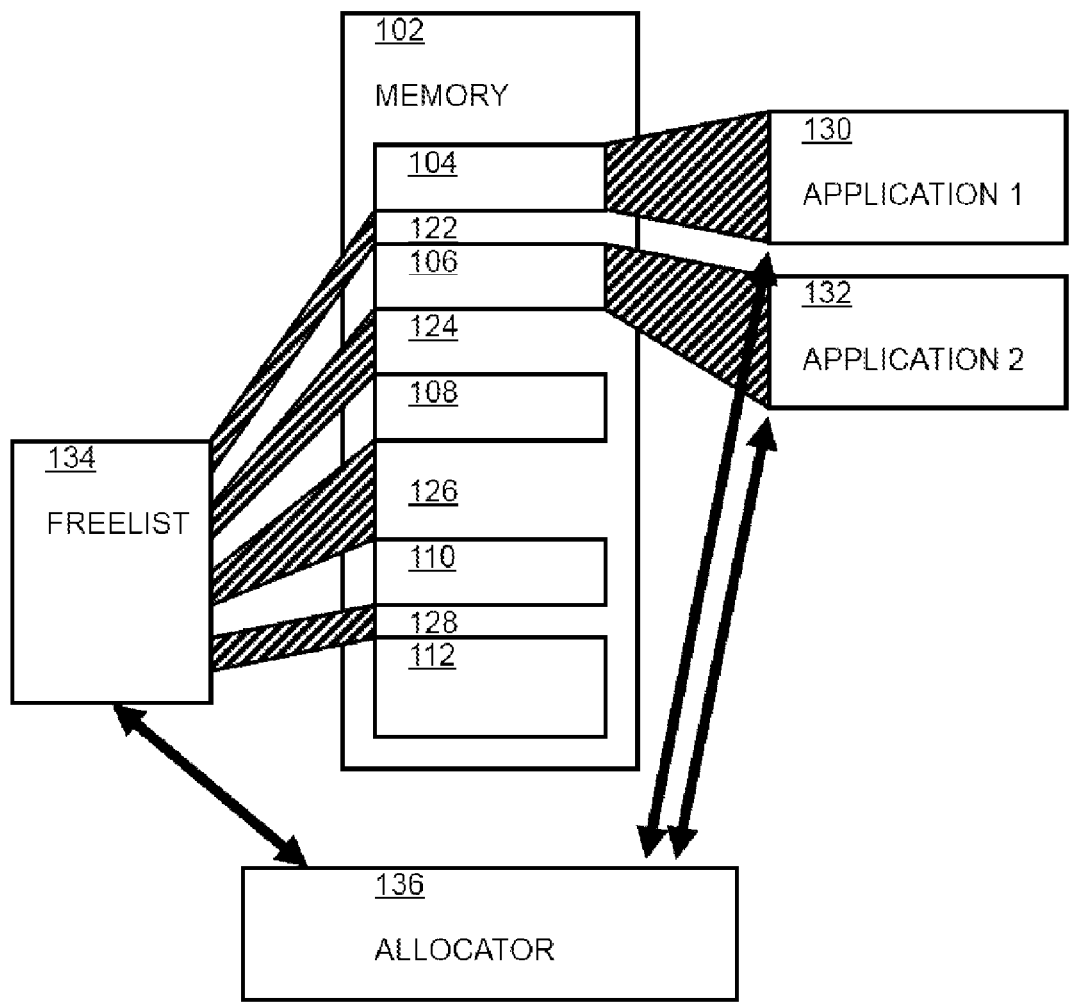
FIG. 1 shows a prior art memory management system having allocated chunks of memory and free holes of memory.

FIG. 1 shows a prior art memory management system having allocated chunks of memory and free holes of memory in which embodiments of the present invention may be implemented. Applications 130, 132 make requests to an allocator 136 to be allocated areas 104, 106 of memory from an area of memory 102 for their use. Such a request may be done using a command such as alloc or malloc. Allocator 136 allocates areas 104, 106 of memory 102 for use by the applications 130, 132 as they request it. FIG. 1 also shows other areas 108-112 of memory 102 which have been allocated to applications not shown in FIG. 1. Each application 130, 132 may make multiple requests to the allocator 136 for areas 104-112 of memory 102 to be allocated and areas 104-112 of memory 102 allocated to an application 130, 132 are not necessarily contiguous. When applications 130, 132 finish using areas 104-112 of memory 102, they return ("release" or "free") the areas 104-112 of memory 102 to the allocator 136 using a command such as free or dealloc. When areas 104-112 of memory 102 are released to the allocator 136, it adds them to a freelist 134 of unallocated areas 122-128 of memory 102. A prior art freelist 134 will be described later with reference to FIGS. 2 to 4.

When a number of requests to allocate and free areas of memory 104-112, 122-128 of memory 102 have been processed the initially long, contiguous free memory areas become fragmented into smaller and smaller areas 122-128. External fragmentation is when the free areas 122-128 between allocated areas 104-112 of memory 102 allocated to the applications 130, 132 are too small to satisfy a new request to allocate from memory 102. One measure of external fragmentation is the percentage of memory that cannot be used for allocation because of the large number of small holes on the freelist, the holes too small to satisfy the allocation requests; another measure of external fragmentation is the increased cost of traversal of the freelist due to encountering a large number of the small holes.

External Memory Fragmentation of 0% means that all of the free memory can be allocated without additional costs in memory usage or computational effort. External Memory Fragmentation of 90% (under the memory usage measure) means that allocator has, for example, an area of memory 102 of size 800 KB but 720 KB cannot be used for allocation due to the small size of the holes.

Figure 2:
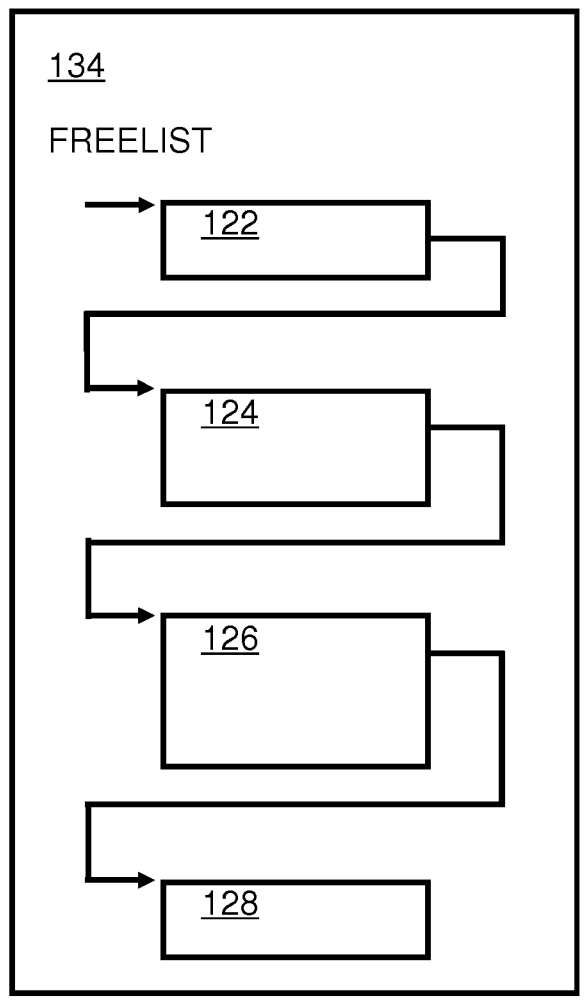
FIG. 2 shows the prior art freelist of free holes of the memory of FIG. 1.

FIG. 2 shows the prior art freelist of free holes of memory of FIG. 1. The free areas 122-128 of memory 102 are connected together in a linked list, using an area of memory in each free area 122-128 of memory as a pointer to the next free area 122-128 of memory. A variable contains a reference to the first area 122 of memory 102. The last area 128 of memory contains a terminator value, usually "NULL", to indicate the end of the linked list. To free a new area 128 of memory 102, a pointer to it is simply placed in the last free area 126 of memory 102 in the linked list. To allocate an area 126 of memory 102, its pointer to a next free area 128 of memory 102 is simply copied into the free area 124 of memory 102 overwriting the existing pointer pointing to the area 126 of memory 102 to be removed from the freelist 134 and to be allocated.

The allocator 136 may itself create free areas 122-128 of memory 102. This may happen when a block of memory 102 of, for example, size 56 bytes is requested by an application 130, 132 and the allocator 136 can only find a block of size 64 bytes. The allocator 136 allocates a first portion of, for example, 56 bytes to the application 130, 132 and creates an 8 byte block of free memory 102, from the remaining second portion of the block of size 64 bytes, which it links to the freelist 134. The allocator stores, in the second portion of the area of memory released by the allocator, an indicator indicating that the second portion of the area of memory is a remaining portion.

Figure 3:
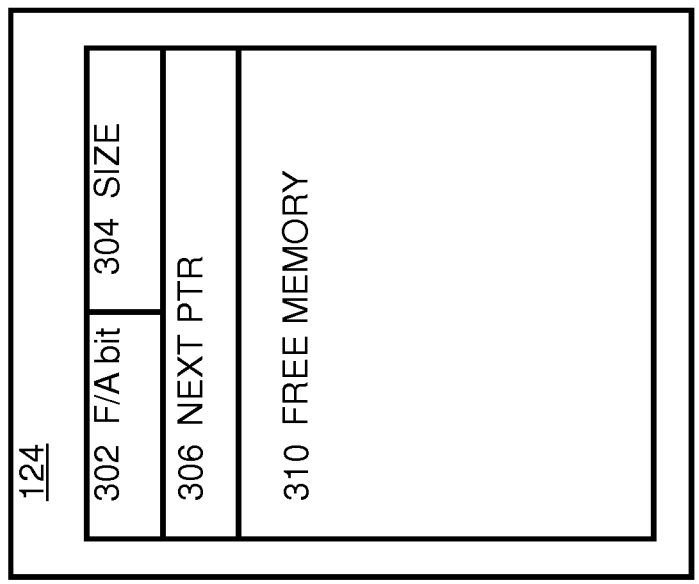
FIG. 3 shows a prior art free hole of the memory of FIG. 1.

FIG. 3 shows a prior art free hole of memory of FIG. 1. Exemplary prior art free hole 124 of memory 102 comprises an indication 304 of the size of the memory hole 124. Typically, the most significant bit 302 is used to indicate whether the associated area of memory 102 is a free hole 124 of memory 102 or whether it is an allocated chunk 106 of memory 102. In other prior art, the free/allocated bit 302 is separate from the indication 304 of size. In another implementation, a mark map is used with a bit being used for each block of memory showing whether each block of memory is free or allocated. If, for example, there are three adjacent bits in the mark map indicating free memory, then there are three contiguous blocks of memory that are free. In another implementation, the size of the memory hole is determined by context. An allocator 136 maintains several separate freelists 134, each freelist 134 containing areas 122-128 of memory 102 of a single given size. Whichever of these implementations of storing the size of the area of memory is used, the allocator uses it to keeps a record of the size in order to carry out conventional allocation.

A next pointer 306 points to the next area 126 of free memory 102 in the freelist 134 as explained above with reference to FIG. 2. The next pointers 306 in each area of free memory form a linked list of free memory areas 122-128. Free memory 310 forms the remaining portion of the free hole 124 of memory 102.

Figure 4:
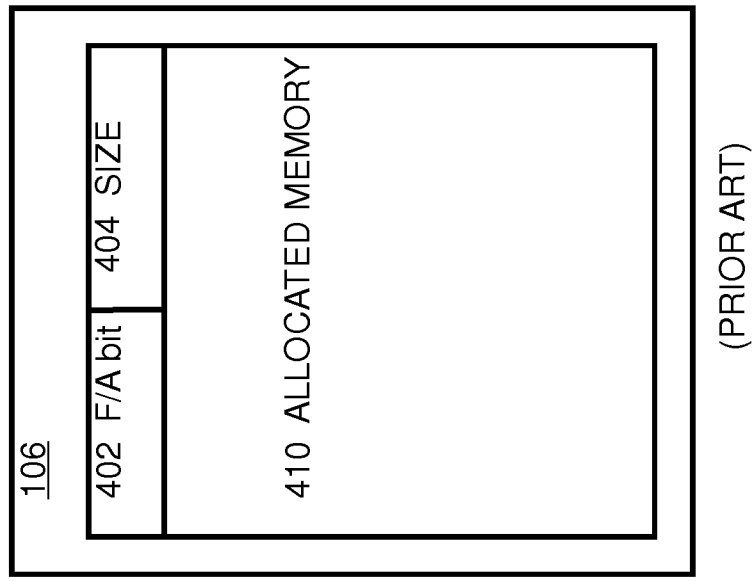
FIG. 4 shows a prior art allocated chunk of the memory of FIG. 1.

FIG. 4 shows a prior art allocated chunk of memory of FIG. 1. Exemplary prior art allocated chunk 106 of memory 102 comprises an indication 404 of the size of the memory chunk 106. Typically, the most significant bit 402 is used to indicate whether the associated area of memory is a free hole 124 of memory 102 or whether it is an allocated chunk 106 of memory 102. In other prior art, the free/allocated bit 402 is separate from the indication 404 of size. The next pointer 306 as seen in free chunk 124 is not needed for allocated memory 104-112 as there is no linked list of allocated memory. Allocated memory 410 forms the remaining portion of the allocated chunk 106 of memory 102.

Figure 5:
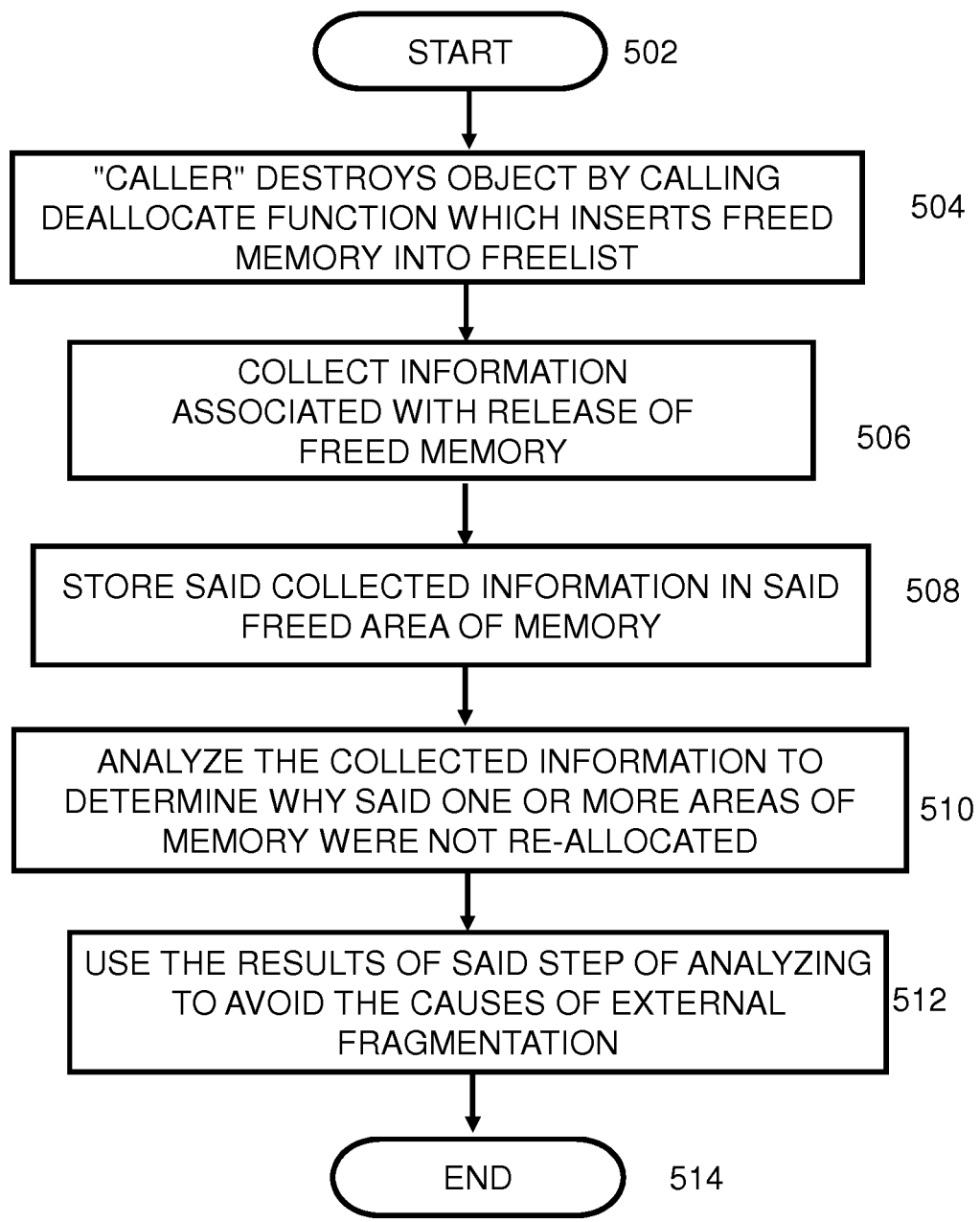
FIG. 5 shows a flow chart of a first embodiment of a method according to the present invention of determining what and/or who is causing external fragmentation, in accordance with one embodiment of the present invention.

FIG. 5 shows a flow chart of a first embodiment of a method according to the present invention of determining what and/or who is causing external fragmentation. The method starts at step 502. At step 504, an application's 130, 132 method such as a routine, function or the like, referred to as the "caller", wishes to destroy an object that is no longer required. The caller calls the allocator's 136 deallocate function in order to free the area of memory which was previously allocated to the object. The allocator 136 inserts the area of memory into the freelist as described above with reference to FIG. 2. At step 506, information associated with the release of the area of memory which was previously allocated to the object is collected. The information collected may relate to the causes of destruction of one object. In other embodiments, the information collected may relate to more than one object. The information (602-608 in FIG. 6) that is stored is purely exemplary and may include some, all or none of the information 602-608 shown as well as other information not shown. All of the information 602-608 may not be stored if there is insufficient space available in the free area 122 of memory 102. The information 602-608 stored relates to who created or destroyed the object which previously owned the area 122 of memory 102 or where the object which previously owned the area 122 of memory 102 was created or destroyed.

Figure 6:
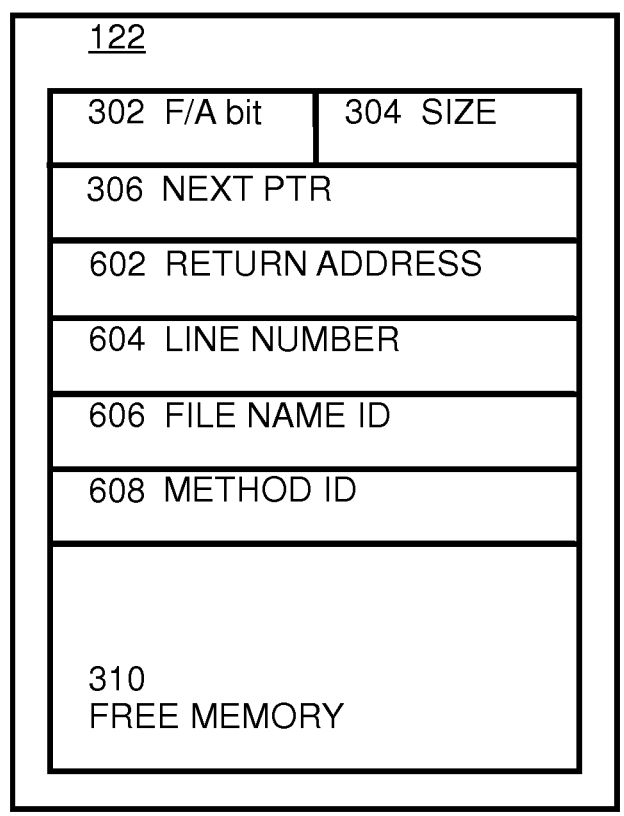
FIG. 6 shows a free hole of memory of FIG. 3 together with the information stored therein by the embodiment of FIG. 5, in accordance with one embodiment of the present invention.

Referring to FIG. 6, the information stored may include the return address 602 of the caller which destroyed the object and consequently freed or deallocated the area 104-112 of memory 102; the return address 602 can be used to identify the caller itself. This return address can be obtained by the allocator 136 walking the call stack for the current thread. A conventional stack walker is used for the language and platform being used. The stack is walked until the return address back to the caller is found. Because the entry point or entry points into the deallocation method of the allocator 136 are well defined, the location of the return address in the call stack for the current thread can be determined.

The information stored may also include the line number 604, the file name ID 606 and the method ID 608 where the object was created and/or where it was destroyed. Each of these may be obtained by being passed to the allocator 136 as a parameter to the deallocate, dealloc or free command. In an embodiment implemented in the C++ language, _FILE_, _LINE_ and _func_ (or _FUNCTION_) are typically built in variables that at the time of compilation give the current full path and file name, current line number and current function name respectively. For example, a conventional free command might be: deallocate (Pointer1); to dispose of the memory allocated to object pointed to by the variable *Pointer1. In embodiments of the invention, a deallocate command might be: deallocate (Pointer1, 102, "ClassA::methodA"); for the function "ClassA::methodA" at line number 102 to dispose of the memory allocated to the object pointed to by variable *Pointer1. In other embodiments, instead of a line number, a statement number from the source file may be used as a parameter. The names may be converted into shorter IDs to be stored as FILE NAME ID 606 and METHOD ID 608 by using a hash table to store the names as strings referenced by IDs. Later, when post-processing, the hash table can be used to look up the associated strings given the IDs.

In another embodiment, an object is "alive" when the application or one or more other live objects holds a reference to that object. The object dies when all references to that object from all live objects and from the application are removed. When the last reference is removed, the object is destroyed and the application function that causes this to happen may be determined by the prior art method of reference counting. Reference counting is a technique of storing the number of references, pointers, or handles to an object. In this embodiment, the allocator stores reference counts associated with or in the objects themselves. The application uses allocator methods to add or remove references to and between objects. When the application function removes the last reference to the object via the allocator's methods, the object's reference count will reduced to zero, the object is known to have died at that point, and the allocator will deallocate the memory associated with the object that just died. At this precise point the allocator can determine the function which caused the object to be destroyed. As described earlier, the allocator may walk the call stack until it reaches the entry point into the allocator's remove reference method. The return address of the function can be determined. Or in a similar way, additional parameters may be passed to the remove reference method that contain the current file name, current line number and current function name of the function.

In embodiments of the invention, further information may be stored in free area 122 of memory 102, including, but not limited to: (i) the number of allocation requests "N_not_sat" on a freelist 134 for which that free area 122 of memory 102 did not satisfy the request; (ii) the elapsed/CPU time between when the object was created until when it was destroyed; (iii) the number of allocation requests or the total size of allocation requests that occurred whilst the object that previously own the area 122 of memory 102 was alive; and (iv) other information such as the thread ID or the module ID of the function that caused the object to be destroyed.

Each free area of memory 122-128 will contain all or some or none of the above information related to that particular area of memory, and the causes of the one or more the objects' destruction. The number of allocation requests "N_not_sat" on a freelist 134 for which that free area 122-128 of memory 102 did not satisfy the request is useful because it enables embodiments of the present invention to distinguish those free areas 122-128 of memory 102 that were recently added to the freelist 134 from those free areas 122-128 of memory 102 that have been on the freelist 134 for a long time and which are not "useful", that is, those free areas 122-128 of memory 102 that were not able to satisfy allocation requests. The number of allocation requests "N_not_sat" can be implemented as a counter stored together with the other information 602-608, the counter being incremented each time each of the areas of memory 122-128 is examined by the allocator 136 for an allocation request, but is not used for the allocation.

The elapsed time or the CPU time between when the object was created until when it was destroyed is useful because free areas 122-128 of memory 102 that were previously allocated to objects that lasted only a short elapsed time or a short CPU time, known as short lived objects, are the sort of objects that create more holes. The start time when the object was created can be stored together with the other information when the area of memory 122 is allocated to the object. The time when the object is destroyed is known at the time when the object is deallocated. The difference between these two times is how long, either elapsed time, or CPU time, or both, the object was alive.

The increase in the number of allocations of memory or in the total size of allocations of memory between when the object was created until when it was destroyed is another measure of whether the object was a short lived object or a long lived object. The number of allocations that have occurred up until the object was created can be stored together with the other information when the area of memory 122 is allocated to the object. The number of allocations that have occurred up until the object is destroyed is known at the time the object is deallocated. The difference between these two numbers is the number of allocations of memory that have occurred whilst the object was alive.

When the allocator 136 attempts to allocate memory to an application 130, 132 it searches the freelist 134 looking for a suitably sized area of memory 122-128 to allocate from. When it finds such an area of memory, the area of memory may be much larger than the requested allocation size. The allocator 136 allocates part of the area of memory, inserting the remainder of the area of memory onto the freelist 134. To do this it will split the area of memory into two parts, creating two objects, the allocation object and the remnant object. The allocation object is returned to the application to satisfy the allocation request. The remnant object is inserted into the freelist 134, and thus immediately "dies". In an embodiment of the invention, depending on how much space is available in the free area of memory, when the allocator 136 does this, the allocator 136 records a specialized method ID (in the free area of memory 122) that indicates the "insert remainder" action of the allocator 136 associated with the remnant's release onto the freelist 134. Similarly when areas of memory are coalesced, the allocator 136 records a specialized method ID that indicates the coalescing action of the allocator 136. In a similar way, one coalesced object is created from the two or more areas of memory that are coalesced, and that coalesced object immediately "dies" and is inserted back into the freelist 134. Note that the specialized method ID may overwrite the previous method ID 608 or the specialized method ID may be appended to earlier method IDs 608 for that area of memory 122, so that information about the original cause of the hole is still available at data analysis time.

Returning to FIG. 5, at step 508, the information collected at step 506 is stored in the area of memory 122 that is being freed and which was previously associated with the now destroyed object that owned the previously allocated, now free, area of memory 122. Referring briefly to FIG. 6, which shows the free hole 122 of memory 102 of FIG. 3 together with the information 602-608 stored therein by step 508 of the embodiment of FIG. 5.

At step 510, the collected information is analyzed to determine why the one or more areas 122-128 of memory 102 were not reallocated to any application. Such analysis may be, for example, to collect a statistical profile of who created and who caused these objects to be destroyed and/or where these objects were created or where they were destroyed. Such a statistical profile may be a histogram showing the number of free areas 122-128 for categories of size of the areas 122-128. This might show that most of the free areas 122-128 of memory 102 that could not be allocated comprised small holes between allocated areas of memory 102. In that case, the source code of the method which creates and/or causes those objects to be destroyed can be investigated to determine what sort of objects were created, why they had short lifetimes and to determine other means to avoid the external fragmentation.

In an embodiment of the invention as part of a diagnostic tool, the collected information stored in the free areas 122-128 of memory 102 can be analyzed either (i) when a request is made by an analyst (in situ analysis) or (ii) when the application terminates (post-mortem analysis).

In an embodiment of the invention as part of an adaptive allocator 136, the collected information stored in the free areas 122-128 of memory 102 can be analyzed when the allocator decides to make corrective actions.

Referring to FIG. 7, for each caller ID (as determined by its filename, method, function, or routine name, and/or line number) a set of statistical metrics 700 is maintained based on the information collected. In exemplary embodiments, the count 702 of the number of areas of memory 122-128 associated with that caller ID, the mean value 704 of the sizes of the areas of free memory 122-128, or a histogram 706 of the sizes of free areas of memory 122-128, on the freelist 134 that contain the indicator(s) of that caller as recorded during data collection is maintained.

Each caller ID is associated with a set of statistical metrics 700; and the set of statistical metrics may be stored and retrieved, for example, by using the caller ID as the key to a hash table, as will be familiar to persons skilled in the art. There may be other statistical metrics maintained in the set of metrics 700, for instance, the total count 708 of all unsatisfied allocation requests across all areas of memory 122-128 associated with the caller ID, the mean lifetime 710 of the objects that were destroyed when they were alive, associated with the caller ID, in units of either CPU or elapsed time; mean lifetime 712 of the objects in units of the number of allocations that the application made during those lifetimes; or mean lifetime 714 of the objects in units of the number of bytes allocated that the application made. The metrics 702-714 may all be present, they may be present in any combination or any one only may be present.

Figure 8:
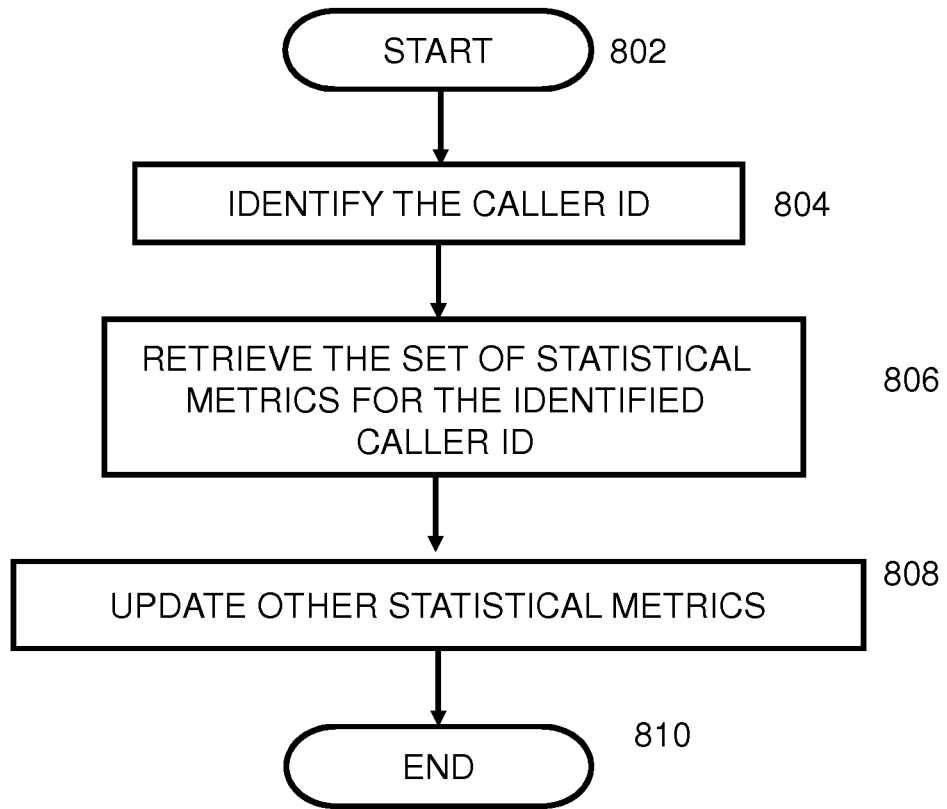
FIG. 8 shows a flow chart of the analysis step 510 of FIG. 5, in accordance with one embodiment of the present invention.

FIG. 8 shows a flow chart of an embodiment of the analysis step 510 of FIG. 5. The method starts at step 802. The statistical metrics 700 are generated by examining the freelist 134. At step 804, for each area of memory 122-128 on the freelist 134 the caller ID is first identified. The caller ID is either one or more of: the method ID, thread ID, module ID, the line number, the filename ID or the return address in the method, which may be mapped to the caller method ID and/or line number from symbol information that may be written into the object file or into a separate "debug information" file. The mapping of the caller ID from symbol information will be familiar to persons skilled in the art.

At step 806, the set of statistical metrics 700 being calculated for that caller ID is retrieved, and updated with the collected information for the current area of memory being examined. For example, the count 702 of the number of areas of memory 122-128 that are associated with the caller ID may be updated, the mean value 704 of the sizes of the areas of memory for the caller ID may be updated using the known size 304 from that stored in the area of memory 122, and/or the histogram 706 of the sizes of the areas of memory for the caller ID may be updated using the known size 304.

At step 808, other statistical metrics 708-714 may be updated for that caller ID. For example the total number of unsatisfied allocation requests 708 for that caller ID may be updated, based on the number of unsatisfied allocation requests "N_not_sat" for the area of memory being examined. Also as an example, the mean lifetime 710 in units CPU or elapsed time of the objects that were destroyed when they were alive for that caller ID may be updated using the period of time in CPU or elapsed time when the object associated with area of memory was alive. The method ends at step 810.

It is understood that there may be many different statistical metrics that could be taken, and the above gives only a selection of them. Also some of the metrics may led to hierarchical information due to the caller ID having a hierarchical nature. For instance the resulting statistics may show what happens by module that the method resides within, then within the method, and then the line number. The information may be augmented with source code.

The statistical data may be either (i) passed to another component of the system that is part of an adaptive allocator 136 which will use the information to modify allocator 136 behavior; or (ii) passed to a profiling tool, which will use the information to output a diagnostic report to a performance analyst, who will use the report to make changes to the application or allocator to reduce fragmentation. There is much prior art about how statistics may be visualized in such a way to indicate a rich view of the data (for example Performance Inspector available from SourceForge, vtune available from Intel Corp. or oprofile available from Source-Forge).

An example of how such a diagnostic report for (ii) above may look is shown below for the C++ language. The identification of causes of fragmentation, such as line 10 of ClassA::methodA which also identifies the objects "objA" that produces the fragmentation, is a key advantage of embodiments of the invention.

| Label | Count | %%% | Name |
|---|---|---|---|
| | | Unsatisfied requests | |
| TID | 137254 | 94.49 | Thread_A |
| MOD | 100761 | 69.37 | Module_A |
| SYM | 22122 | 15.23 | ClassA::methodA( ) |
| LIN | 14685 | 10.11 | line 10: Allocator::deallocate(objA); |
| LIN | 6703 | 4.61 | line 40: Allocator::deallocate(objC); |
| ... | | | |
| SYM | 14097 | 9.71 | ClassB::methodE( ) |
| ... | | | |
| MOD | 35719 | 24.59 | Module_B |
| | | Size of hole < 16 bytes | |
| TID | 3993 | 89.07 | Thread_A |
| MOD | 2636 | 58.80 | Module_A |
| SYM | 1523 | 33.97 | ClassA::methodA( ) |
| LIN | 1278 | 28.51 | line 10: Allocator::deallocate(objA); |
| LIN | 107 | 2.39 | line 40: Allocator::deallocate(objC); |
| ... | | | |
| SYM | 1024 | 22.84 | ClassB::methodE( ) |
| ... | | | |
| MOD | 1241 | 27.68 | Module_B | where:
Label—the hierarchy level in which the events occurred:
   TID—thread level
   MOD—module level
   SYM—symbol level
   LIN—line number
Count—count of given report metric (for example, unsatisfied requests, holes whose size<16 bytes)
%%%—proportion (as a percentage) of this metric within this symbol
Name—the symbol name (that is, thread id name, module name, method name, line number and source code at that line).

At step 512, the results of the investigation may be used to change the allocation of memory so as to avoid the causes of external fragmentation. The allocator uses the results of step 510 to better allocate the sort of objects that are causing the external fragmentation. The method ends at step 514.

Figure 9:
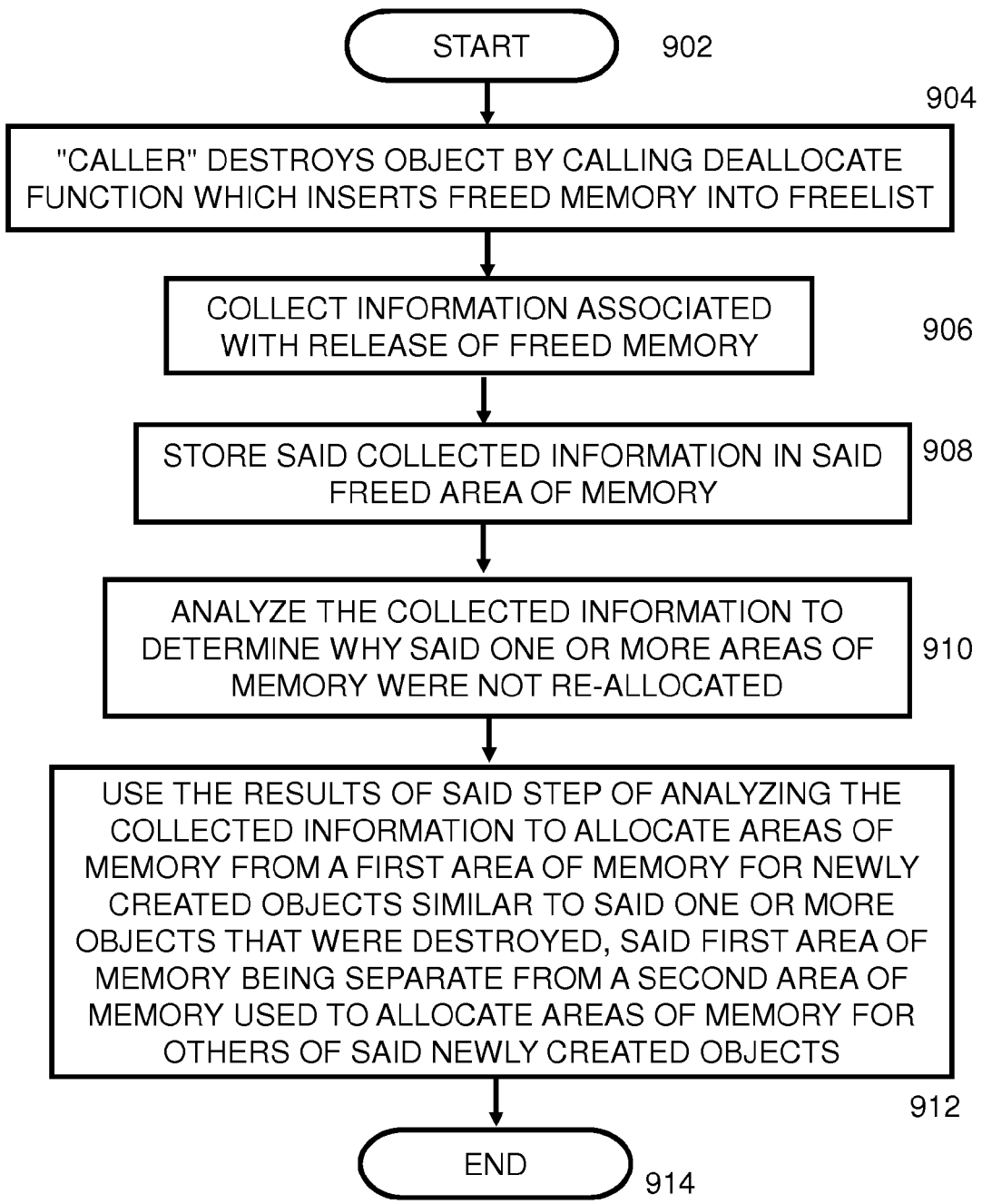
FIG. 9 shows a flow chart of a second embodiment of a method according to the present invention of determining what and/or who is causing external fragmentation, in accordance with one embodiment of the present invention.

FIG. 9 shows a flow chart of a second embodiment of a method according to the present invention of determining what and/or who is causing external fragmentation. Steps 502 to 510 are the same as those already described above with reference to FIG. 5. At step 912, the results of the analysis of the collected information of step 510 are used to allocate areas of memory 102 from a first area of memory for newly created objects similar to the one or more objects that were destroyed the first area of memory being separate from a second area of memory used to allocate areas of memory for others of the newly created objects. In this embodiment, if the data analysis determines a first application or a particular first method often causes defragmentation by requesting and then releasing small areas of memory whilst a second application or a particular second method requests and then releases much larger areas of memory, requests from the first application and the second application may be allocated from separate areas of memory. The method ends at step 914. In an embodiment, the newly created objects in the first area of memory are of a different size, typically small objects, to the newly created objects, typically large objects, in the second area of memory.

Embodiments of the invention require knowledge of when and where an object dies, and thus where it dies needs to be well defined and explicit within the program source. For instance, for automatic memory management, such as the IBM® Java® Virtual Machine Garbage Collector, the program only implicitly determines when an object dies, which occurs (predominately) when the object is no longer referenced by live objects. Thus one cannot determine "who" destroyed the object, as dead objects are discovered at garbage collection only. In such embodiments, when the garbage collector utilizes reference counting this may be used to determine when an object dies. However in many allocation schemes, such as many memory models in C/C++, there are very clear definitions of "who" destroyed an object and "where" it died in the program source.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining causes of external fragmentation in a memory, wherein an area of the memory is released by an application, deallocated by an allocator, and not reallocated to any application, the method comprising:
   collecting information associated with release of the area of the memory by the application;
   storing the information in the area of the memory;
   analyzing the information to determine why the area of the memory has not been reallocated to any application, and
   wherein the information further comprises one or more of allocation requests which cannot be satisfied using the area of the memory, a measure of time between creation of the one or more objects and destruction of the one or more objects, an indicator of a number or sizes of areas of the memory which are allocated between creation of the one or more objects and destruction of the one or more objects.

2. The method of claim 1, wherein:
   the application releases the area of the memory, responsive to destruction of one or more objects; and
   the information is associated with causes of the destruction of the one or more objects.

3. The method of claim 2, wherein the information includes an identifier associated with computer readable program code that causes the one or more objects to be created, an identifier associated with computer readable program code that causes the one or more objects to be destroyed; wherein the information identifies, in the computer readable program code that causes the one or more objects to be created, a location where the one or more objects are created; wherein the information identifies, in the computer readable program code that causes the one or more objects to be destroyed, a location where the one or more objects are destroyed.

4. The method of claim 2, wherein the information further comprises statistical data associated with a size of each of areas of the memory which are released by the one or more objects when they are destroyed.

5. The method of claim 2, further comprising:
   using results of analyzing the information to allocate areas of the memory from a first area of the memory for newly created objects similar to the one or more objects that are destroyed, the first area of the memory being separate from a second area of the memory used to allocate the areas of the memory to others of the newly created objects.

6. The method of claim 1, further comprising:
using results of analyzing the information to change allocation of the memory so as to avoid the causes of external fragmentation.

7. A method for determining causes of external fragmentation in a memory, wherein a first portion of an area of a memory is allocated to an application by an allocator and a second portion of the area of the memory is released by the allocator, the method comprising:
storing, in the second portion of the area of the memory, an indicator indicating that the second portion is a remaining portion;
colleting information associated with release of the second portion;
storing the information in the second portion;
analyzing the information to determine why the second portion is not reallocated to any application, and
wherein the information further comprises a number of allocation requests which cannot be satisfied using the second portion released by the allocator.

8. The method of claim 7, further comprising:
using results of analyzing the information to change allocation of the memory so as to avoid the causes of external fragmentation.

\* \* \* \* \*